(12) United States Patent
Choi et al.

(10) Patent No.: US 10,224,296 B2
(45) Date of Patent: Mar. 5, 2019

(54) DEVICE AND METHOD FOR GENERATING IDENTIFICATION KEY

(71) Applicant: ICTK Holdings Co., Ltd., Seongnam-si (KR)

(72) Inventors: Byong Deok Choi, Seoul (KR); Dong Kyue Kim, Seoul (KR)

(73) Assignee: ICTK Holdings Co., Ltd., Seongnam-si (KR)

(*) Notice: Subject to any disclaimer, the term of this patent is extended or adjusted under 35 U.S.C. 154(b) by 0 days.

(21) Appl. No.: 14/916,949

(22) PCT Filed: Feb. 17, 2014

(86) PCT No.: PCT/KR2014/001248
§ 371 (c)(1),
(2) Date: Mar. 4, 2016

(87) PCT Pub. No.: WO2015/034145
PCT Pub. Date: Mar. 12, 2015

(65) Prior Publication Data
US 2016/0225724 A1    Aug. 4, 2016

(30) Foreign Application Priority Data

Sep. 6, 2013  (KR) .................. 10-2013-0107217

(51) Int. Cl.
*H01L 23/00* (2006.01)
*G06F 21/73* (2013.01)
(Continued)

(52) U.S. Cl.
CPC ............ *H01L 23/576* (2013.01); *G06F 21/73* (2013.01); *G09C 1/00* (2013.01); *H01L 27/0207* (2013.01);
(Continued)

(58) Field of Classification Search
CPC .... H01L 23/576; H01L 27/0207; G06F 21/73
(Continued)

(56) References Cited

U.S. PATENT DOCUMENTS 5,680,057 A * 10/1997 Johnson ............... G01R 1/0433
324/762.02
5,811,869 A * 9/1998 Seyyedy ............... G11C 17/16
257/530

(Continued)

FOREIGN PATENT DOCUMENTS

JP           3804670 B2     8/2006
KR     1020090068987 A     6/2009
(Continued)

OTHER PUBLICATIONS

Sreedhar, A. et al., "Physically Unclonable Functions for Embeded Security based on Lithographic Variation," Proceedings of Design, Automation & Test in Europe Conference, Mar. 14, 2011, Grenoble, France, 6 pages.
(Continued)

*Primary Examiner* — Bo Fan
(74) *Attorney, Agent, or Firm* — McCoy Russell LLP

(57) ABSTRACT

Provided is a device for generating an identification key using a process variation during a manufacturing process of a conductive layer. The device for generating an identification key may include a plurality of conductive layers designed so as to be formed in a first region within a semiconductor chip, the density in which the plurality of conductive layers are disposed in the first region being at least a first threshold value and not more than a second threshold value, the first and second threshold values being less than a minimum density according to the design rules for ensuring that all of the plurality of conductive layers are formed in the first region; and a reader which provides an identification key by identifying if, among the plurality of
(Continued)

conductive layers, a previously designated first conductive layer has been formed.

6 Claims, 5 Drawing Sheets

(51) Int. Cl.
    *H01L 27/02*     (2006.01)
    *G09C 1/00*     (2006.01)
    *H04L 9/08*     (2006.01)

(52) U.S. Cl.
    CPC ........ *H04L 9/0866* (2013.01); *H04L 2209/12* (2013.01)

(58) Field of Classification Search
    USPC ......... 726/2, 25; 380/44; 713/156, 194, 184, 713/155, 168; 702/182; 257/392
    See application file for complete search history.

(56) References Cited

U.S. PATENT DOCUMENTS

| | | | |
|---|---|---|---|
| 2007/0132109 A1* | 6/2007 | Jacobsen | H01L 23/4952 257/784 |
| 2008/0256600 A1* | 10/2008 | Schrijen | G06F 21/86 726/2 |
| 2010/0070777 A1 | 3/2010 | Salters et al. | |
| 2013/0101114 A1 | 4/2013 | Kim et al. | |
| 2014/0108786 A1* | 4/2014 | Kreft | G06F 21/71 713/156 |
| 2015/0222430 A1* | 8/2015 | Kim | H04L 9/0866 380/44 |

FOREIGN PATENT DOCUMENTS

| | | |
|---|---|---|
| KR | 100926214 B1 | 11/2009 |
| KR | 101139630 B1 | 5/2012 |
| KR | 1020120089607 A | 8/2012 |

OTHER PUBLICATIONS

Verbauwhede, I. et al., "Physically Unclonable Functions: Manufacturing Variability as an Unclonable Device Identifier," Proceedings of the 21st Edition of the Great Lakes Symposium on VLSI (GLSVLSI 2011), May 2, 2011, Lausanne, Switzerland, 6 pages.
European Patent Office, Extended European Search Report Issued in Application No. 14842198.5, dated Dec. 19, 2016, Germany, 8 pages.
ISA Korean Intellectual Property Office, International Search Report Issued in Application No. PCT/KR2014/001248, dated May 26, 2014, WIPO, 5 pages.

* cited by examiner

500

600

DEVICE AND METHOD FOR GENERATING IDENTIFICATION KEY

CROSS REFERENCE TO RELATED APPLICATIONS

The present application is a U.S. National Phase of International Patent Application Serial No. PCT/KR2014/001248, entitled "DEVICE AND METHOD FOR GENERATING IDENTIFICATION KEY," filed on Feb. 17, 2014, which claims priority to Korean Patent Application No. 10-2013-0107217, entitled "DEVICE AND METHOD FOR GENERATING IDENTIFICATION KEY," filed on Sep. 6, 2013, the entire contents of each of which are hereby incorporated by reference for all purposes.

TECHNICAL FIELD

The following description relates to a device and method for generating an identification key for hardware security, and more particularly, to a device and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physically unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an inter-layer contact or a via is formed between conductive layers of a semiconductor based on a semiconductor process variation.

DISCLOSURE OF INVENTION

Technical Solutions

According to an aspect of the present invention, there is provided a device for generating an identification key, the device including a plurality of conductive layers designed to be formed in a first region in a semiconductor chip, a density of the plurality of conductive layers disposed in the first region being equal to or greater than a first threshold and equal to or less than a second threshold, and the first threshold and the second threshold being less than a minimum density according to a design rule that ensures that all the plurality of conductive layers are formed in the first region, and a reader configured to determine whether a first conductive layer designated in advance among the plurality of conductive layers is formed and to provide an identification key.

The first threshold may be a lower limit value of a density range to allow a difference between a probability that the first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

Also, the first threshold may be equal to or greater than a maximum density that guarantees that the first conductive layer is not formed, and the second threshold may be equal to or less than a minimum density that guarantees that the first conductive layer is formed.

The first conductive layer may be at least one conductive layer located between conductive layers forming a boundary of the first region among the plurality of conductive layers.

Whether the first conductive layer is formed may be randomly determined by a process variation due to a dishing phenomenon occurring in a manufacturing process of the conductive layers.

At least a portion of the plurality of conductive layers may correspond to at least one of a poly layer and a metal layer.

According to another aspect of the present invention, there is provided a method of designing a device for generating an identification key, the method including disposing a plurality of conductive layers in a first region in a semiconductor chip, a density of the plurality of conductive layers disposed in the first region being equal to or greater than a first threshold and equal to or less than a second threshold, and the first threshold and the second threshold being less than a minimum density according to a design rule that ensures that all the plurality of conductive layers are formed in the first region, and disposing a reader configured to determine whether a first conductive layer designated in advance among the plurality of conductive layers is formed and to provide an identification key.

The first threshold may be a lower limit value of a density range to allow a difference between a probability that the first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

Also, the first threshold may be equal to or greater than a maximum density that guarantees that the first conductive layer is not formed, and the second threshold may be equal to or less than a minimum density that guarantees that the first conductive layer is formed.

The first conductive layer may be at least one conductive layer located between conductive layers forming a boundary of the first region among the plurality of conductive layers.

According to another aspect of the present invention, there is provided a method of manufacturing a device for generating an identification key, the method including forming a plurality of conductive layers in a first region in a semiconductor chip, a density of the plurality of conductive layers formed in the first region being equal to or greater than a first threshold and equal to or less than a second threshold, and the first threshold and the second threshold being less than a minimum density according to a design rule that ensures that all the plurality of conductive layers are formed in the first region, and forming a reader in the semiconductor chip, the reader being configured to determine whether a first conductive layer designated in advance among the plurality of conductive layers is formed and to provide an identification key.

The first threshold may be a lower limit value of a density range to allow a difference between a probability that the first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

Also, the first threshold may be equal to or greater than a maximum density that guarantees that the first conductive layer is not formed, and the second threshold may be equal to or less than a minimum density that guarantees that the first conductive layer is formed.

Whether the first conductive layer may be formed is randomly determined by a process variation due to a dishing phenomenon occurring in a manufacturing process of the conductive layers.

According to another aspect of the present invention, there is provided a method of generating an identification key, the method including forming a plurality of conductive layers in a first region in a semiconductor chip, a density of the plurality of conductive layers formed in the first region being equal to or greater than a first threshold and equal to or less than a second threshold, and the first threshold and the second threshold being less than a minimum density according to a design rule that ensures that all the plurality of conductive layers are formed in the first region, and determining whether a first conductive layer designated in advance among the plurality of conductive layers is formed and providing an identification key.

The first threshold may be a lower limit value of a density range to allow a difference between a probability that the first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

Also, the first threshold may be equal to or greater than a maximum density that guarantees that the first conductive layer is not formed, and the second threshold may be equal to or less than a minimum density that guarantees that the first conductive layer is formed.

BEST MODE FOR CARRYING OUT THE INVENTION

Figure 1:
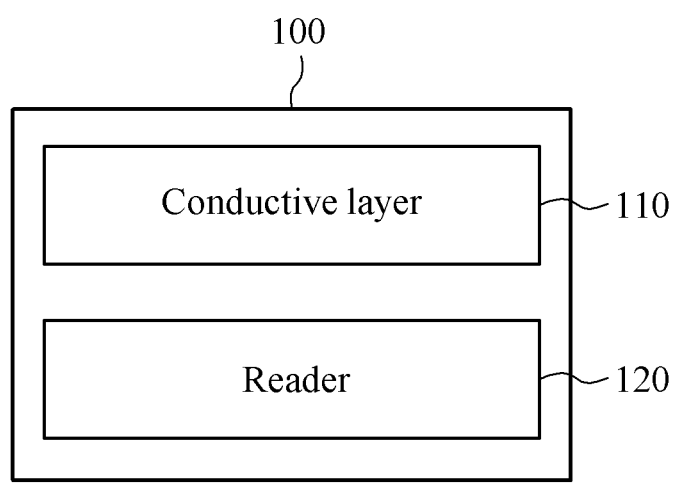
FIG. 1 is a block diagram illustrating of a device for generating an identification key according to an embodiment.

Hereinafter, some embodiments will be described in detail with reference to the accompanying drawings. The inventive concept, however, should not be construed as limited to the embodiments set forth herein. Like reference numerals in the drawings refer to like elements throughout the present disclosure.

The terms used herein are mainly selected from general terms currently being used in light of functions in the present invention. Yet, the meanings of the terms used herein may be changed to keep up with the intent of an operator in the art, a custom, or the appearance of new technologies.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

FIG. 1 is a block diagram illustrating a configuration of a device 100 for generating an identification key according to an embodiment.

The device 100 may correspond to at least a portion of a physically unclonable function (PUF) configured to allow nodes to be probabilistically connected by a process variation in a semiconductor manufacturing process.

The device 100 may include a plurality of conductive layers 110 formed by a process variation due to a dishing phenomenon that may occur in a manufacturing process.

The dishing phenomenon may refer to a phenomenon in which a thickness of a conductive layer decreases towards a central portion of a predetermined region because a large number of conductive layers located in the central portion is removed in comparison to an edge of the predetermined region during a chemical mechanical planarization (CMP) in a photolithography process of a semiconductor process. When a process is performed instead of adding, to the predetermined region, a dummy layer to satisfy a density condition required by a design rule for the semiconductor process, the dishing phenomenon may occur.

The design rule may specify a minimum density that ensures that all the plurality of conductive layers 110 are formed normally and disposed in a first region in a semiconductor chip. Hereinafter, unless otherwise stated, the design rule will be understood as described above.

When the plurality of conductive layers 110 are formed in a predetermined region in a semiconductor chip and disposed at a density less than a minimum density required by the design rule for the semiconductor process, an identification key may be generated based on a probability that a pattern is formed in a specific range.

Also, the device 100 may include a reader 120 configured to determine whether at least one conductive layer among the plurality of conductive layers 110 is formed, and may generate an identification key.

The plurality of conductive layers 110 may be designed to be formed in the first region in the semiconductor chip, and may be disposed in the first region at a density equal to or greater than a first threshold and equal to or less than a second threshold.

Here, the first threshold and the second threshold may be less than a minimum density according to a design rule that ensures that all the plurality of conductive layers are formed in the first region.

The density of the plurality of conductive layers 110 may be adjusted in a semiconductor design operation. However, this is merely an example, and it is possible to create the same result through an intended operation in a process. Accordingly, even though description of a portion of a design or a manufacturing process is provided below, it should be understood that there is no limitation to some embodiments by the description.

In an example, when a density of the plurality of conductive layers 110 disposed in the first region is equal to or greater than the minimum density according to the design rule, a pattern may be formed normally on all the plurality of conductive layers 110 through the photolithography process.

In another example, when the density of the plurality of conductive layers 110 in the first region is less than the minimum density according to the design rule, a probability that a pattern is formed on the plurality of conductive layers 110 may decrease, and accordingly a probability that all the plurality of conductive layers 110 are formed normally may also decrease.

The device 100 may allow the plurality of conductive layers 110 to be formed in the first region at a density less than the minimum density according to the design rule, and may generate the identification key based on whether a first conductive layer designated in advance among the plurality of conductive layers 110 is formed in the above density.

The first conductive layer may be at least one conductive layer designated in advance among the plurality of conductive layers 110, and may be an arbitrary conductive layer located between conductive layers forming a boundary of the first region in which the plurality of conductive layers 110 are disposed.

The first threshold may be a lower limit value of a density range of the plurality of conductive layers 110 to allow a difference between a probability that the first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

For example, the predetermined error range may be set based on a specific value (for example, 50%) corresponding to a probability that the first conductive layer is formed when a pattern is formed normally on the first conductive layer.

In this example, both the probability that the first conductive layer is formed and the probability that the first conductive layer is not formed may exist, and may be utilized to generate the PUF.

Also, the first threshold may be equal to or greater than a maximum density of the plurality of conductive layers 110 to guarantee that the first conductive layer is not formed, and the second threshold may be equal to or less than a minimum density of the plurality of conductive layers 110 to guarantee that the first conductive layer is formed.

When the density of the plurality of conductive layers 110 disposed in the first region is less than the minimum density according to the design rule, a probability that a pattern is formed on all the plurality of conductive layers 110 through the photolithography process may gradually decrease. Also, when the density is equal to or less than a specific density, the pattern may not be formed on all the plurality of conductive layers 110. In this example, the first threshold may be set to be equal to or greater than a maximum value of a density range in which the pattern is not formed on all the plurality of conductive layers 110. Thus, it is possible to have both a probability that the first conductive layer is formed normally and a probability that the first conductive layer is not formed.

When the density of the plurality of conductive layers 110 in the first region increases, a probability that the pattern is formed may also increase. When the density is equal to or greater than a specific value, the pattern may be formed on all the plurality of conductive layers 110. In this example, the second threshold may be set to be equal to or less than a minimum value of a density range in which the pattern is formed on all the plurality of conductive layers 110. Thus, it is possible to have both a probability that the first conductive layer is formed normally and a probability that the first conductive layer is not formed.

In this example, when the density of the plurality of conductive layers 110 in the first region is properly set, whether the first conductive layer is formed may be randomly determined by a process variation due to a dishing phenomenon occurring in a manufacturing process of the conductive layers.

At least a portion of the plurality of conductive layers 110 may correspond to at least one of a poly layer and a metal layer.

The reader 120 may determine whether the first conductive layer designated in advance among the plurality of conductive layers 110 is formed, and may provide an identification key based on an output value. An identification key generation process and a circuit configuration of the reader 120 will be further described with reference to FIGS. 5 and 6.

Figure 2:
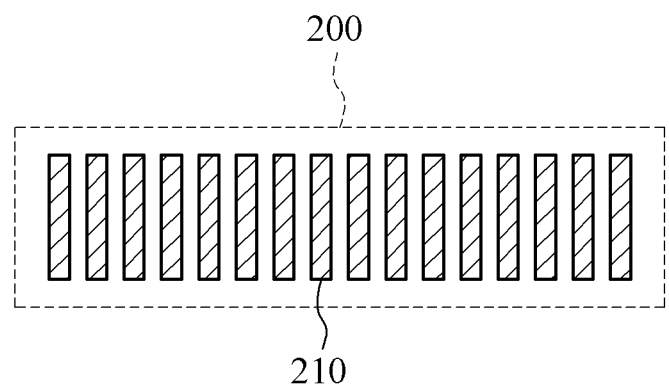
FIG. 2 is a diagram provided to describe a concept of a first region in which a plurality of conductive layers are disposed according to an embodiment.

FIG. 2 is a diagram provided to describe a concept of a first region 200 in which a plurality of conductive layers are disposed according to an embodiment.

The plurality of conductive layers 110 may be disposed in the first region 200 that is a predetermined space in a semiconductor chip.

In an example, when a density of the plurality of conductive layers 110 disposed in the first region 200 is equal to or greater than a minimum density required by a design rule for a semiconductor process, a pattern may be formed on all the plurality of conductive layers 110 in the first region 200 through a photolithography process. In this example, formation of a first conductive layer 210 that is at least one of the plurality of conductive layers 110 may be guaranteed.

In another example, when the density of the plurality of conductive layers 110 disposed in the first region 200 is less than the minimum density according to the design rule, a probability that a pattern is formed normally on the plurality of conductive layers 110 may gradually decrease due to a dishing phenomenon occurring in a photolithography process of a semiconductor, and accordingly a probability that the first conductive layer 210 is formed may also decrease.

The first conductive layer 210 may be designated in advance among the plurality of conductive layers 110 disposed in the first region 200, and may be one of conductive layers located between conductive layers forming a boundary of the first region 200.

For example, the first conductive layer 210 may be a conductive layer located in a central portion among the plurality of conductive layers 110 disposed in the first region 200. However, this is merely an example, and a conductive layer other than conductive layers located in both edges among the plurality of conductive layers 110 in the first region 200 may be designated as the first conductive layer 210. Hereinafter, unless otherwise stated, the first conductive layer 210 should be understood as described above.

When the plurality of conductive layers 110 are disposed in the first region 200, a density of the plurality of conductive layers 110 may be set so that both a probability that a pattern is formed normally and a probability that the pattern is not formed may coexist, and accordingly a PUF may be generated based on whether the first conductive layer 210 is formed.

For example, the density of the plurality of conductive layers 110 disposed in the first region 200 may be set to be less than the minimum density according to the design rule, and thus it is possible to prevent the first conductive layer 210 that is at least one of the plurality of conductive layers 110 from being formed at all times.

A pattern formation result based on a change in a density of the plurality of conductive layers 110 in the first region, and a result of formation of the first conductive layer 210 will be further described with reference to FIGS. 3 and 4.

Figure 3:
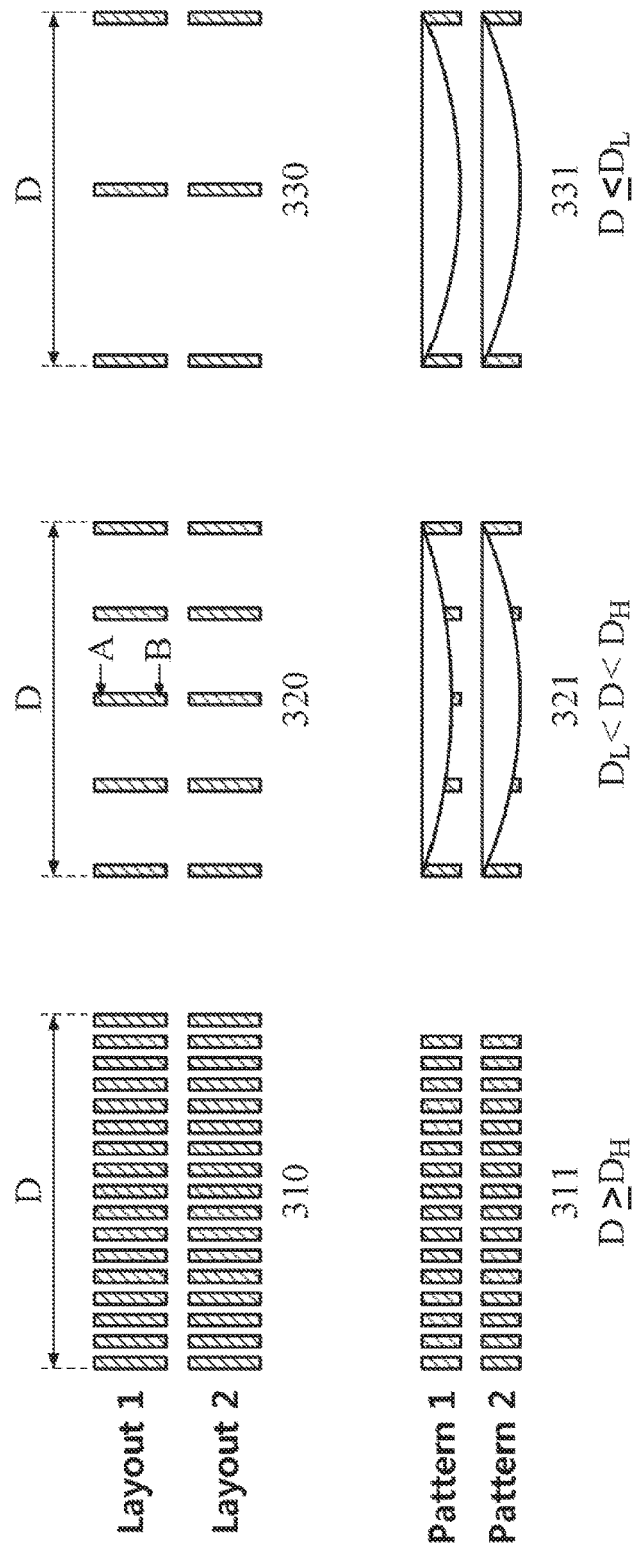
FIG. 3 illustrates a pattern formation based on a change in a density of a plurality of conductive layers according to an embodiment.

FIG. 3 illustrates a pattern formation based on a change in a density of a plurality of conductive layers according to an embodiment. FIG. 4 is a graph illustrating a probability that a pattern is formed based on a change in a density of a plurality of conductive layers according to an embodiment.

Referring to FIG. 3, based on a density D of the plurality of conductive layers 110 in the first region 200, whether a pattern is formed and whether the first conductive layer 210 is formed may be determined.

Figure 4:
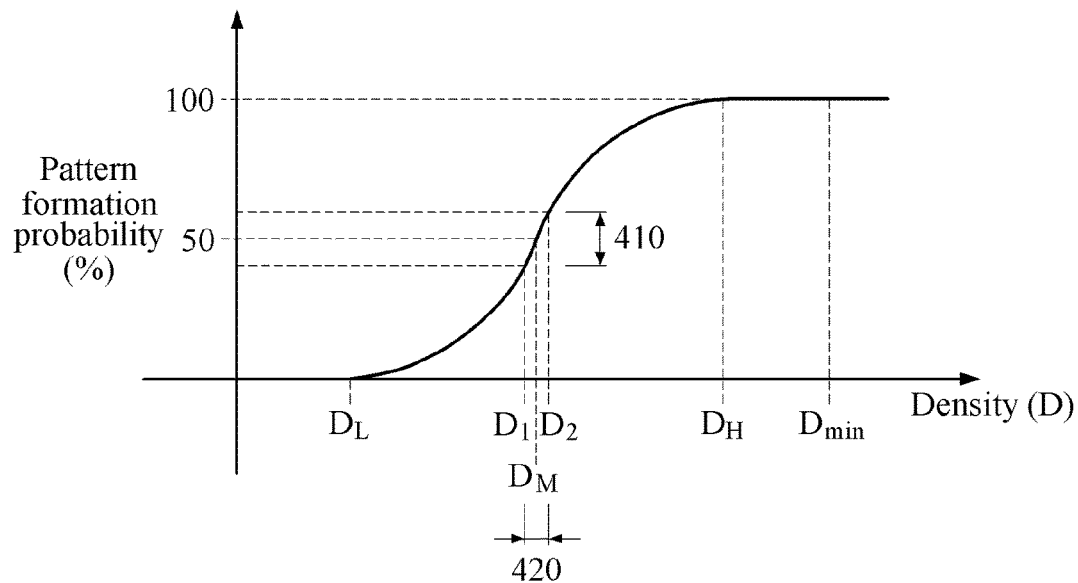
FIG. 4 is a graph illustrating a probability that a pattern is formed based on a change in a density of a plurality of conductive layers according to an embodiment.

In an example, when the density of the plurality of conductive layers 110 disposed in a first region is equal to or greater than $D_H$ of FIG. 4, as indicated by reference numeral 310, a pattern 311 may be formed normally on all the plurality of conductive layers 110, and accordingly the first conductive layer 210 that is at least one of the plurality of conductive layers 110 may be formed at all times. In this example, $D_H$ may be set as a minimum density of the plurality of conductive layers 110 to guarantee that the first conductive layer 210 is formed.

When the density of the plurality of conductive layers 110 disposed in the first region 200 is less than a minimum density according to a design rule, a probability that a pattern is formed normally on the plurality of conductive layers 110 may gradually decrease based on a decrease in the density of the plurality of conductive layers 110, and accordingly a probability that the first conductive layer 210 is formed may also decrease.

In another example, when the density of the plurality of conductive layers 110 disposed in the first region is equal to or less than $D_L$, as indicated by reference numeral 330, a pattern 331 may be formed abnormally on all the plurality of conductive layers 110, and accordingly the first conductive layer 210 that is at least one of the plurality of conductive layers 110 may not be formed. In this example, $D_L$ may be set as a maximum density of the plurality of conductive layers 110 to guarantee that the first conductive layer 210 is not formed.

In still another example, when the density of the plurality of conductive layers 110 disposed in the first region is greater than $D_L$ and less than $D_H$, as indicated by reference numeral 320, both a probability that a pattern 321 is formed on the plurality of conductive layers 110 and a probability that the pattern 321 is not formed may exist, and accordingly whether the first conductive layer is formed may be determined.

For example, a plurality of conductive layers 320 may be disposed in a first region in a semiconductor chip at a density equal to or greater than a first threshold and equal to or less than a second threshold. In this example, the first threshold and the second threshold may be set in a range less than a minimum width according to a design rule that ensures that all the plurality of conductive layers are formed in the first region.

The first threshold may be a lower limit value $D_1$ of a density range of the plurality of conductive layers to allow a difference between a probability that the first conductive layer is formed and a probability that the first conductive layer is not formed to be within a predetermined error range. The second threshold may be an upper limit value $D_2$ of the density range of the plurality of conductive layers to allow the difference between the probability that the first conductive layer is formed and the probability that the first conductive layer is not formed to be within the predetermined error range.

The first threshold, that is, the lower limit value $D_1$ may be set to be equal to or greater than the maximum density $D_L$ guaranteeing that the first conductive layer is not formed. The second threshold, that is, the upper limit value $D_2$ may be set to be equal to or less than the minimum density $D_H$ guaranteeing that the first conductive layer is formed.

Whether the first conductive layer is formed may be randomly determined by a process variation due to a dishing phenomenon occurring in a manufacturing process of the conductive layers.

At least a portion of the plurality of conductive layers may correspond to at least one of a poly layer and a metal layer.

Referring to the graph of FIG. 4, a horizontal axis represents a density of the plurality of conductive layers in the first region 200, and a vertical axis represents a probability that a pattern is formed on the plurality of conductive layers (that is, a probability that a first conductive layer among the plurality of conductive layers is formed).

In the graph, $D_H$ denotes a value equal to or less than a minimum density guaranteeing that the first conductive layer 210 is formed, and $D_L$ denotes a value equal to or greater than a maximum density guaranteeing that the first conductive layer 210 is not formed.

Also, in the graph, $D_{min}$ denotes a minimum density according to the design rule that ensures that all the plurality of conductive layers are formed in the first region 200, and may be set with a predetermined margin with $D_H$.

In addition, $D_M$ theoretically denotes a density of the plurality of conductive layers in the first region 200 representing that a probability that the first conductive layer is formed when a pattern is formed normally on the first conductive layer 210 corresponds to 50%.

For example, when the density of the plurality of conductive layers disposed in the first region 200 is equal to $D_M$, randomness of an identification key, that is, a digital value generated by the device 100 may be maximized. However, because it is difficult to accurately determine $D_M$ in an actual process, the density of the plurality of conductive layers may be set to be closest to $D_M$ by repeating a process of manufacturing and measuring various densities of the plurality of conductive layers.

For example, the density of the plurality of conductive layers may be set in a range 420 between $D_1$ and $D_2$ so that whether the first conductive layer 210 is formed may have a predetermined error 410 based on 50%.

In this example, $D_1$ may be a lower limit value of a density of the plurality of conductive layers to allow a difference between a probability that the first conductive layer 210 is formed and a probability that the first conductive layer 210 is not formed to be within a predetermined error range, and may be equal to or greater than the maximum density of the plurality of conductive layers guaranteeing that the first conductive layer 210 is not formed.

Also, $D_2$ may be an upper limit value of the density of the plurality of conductive layers to allow the difference between the probability that the first conductive layer 210 is formed and the probability that the first conductive layer 210 is not formed to be within the predetermined error range, and may be equal to or less than the minimum density of the plurality of conductive layers guaranteeing that the first conductive layer 210 is formed.

Figure 5:
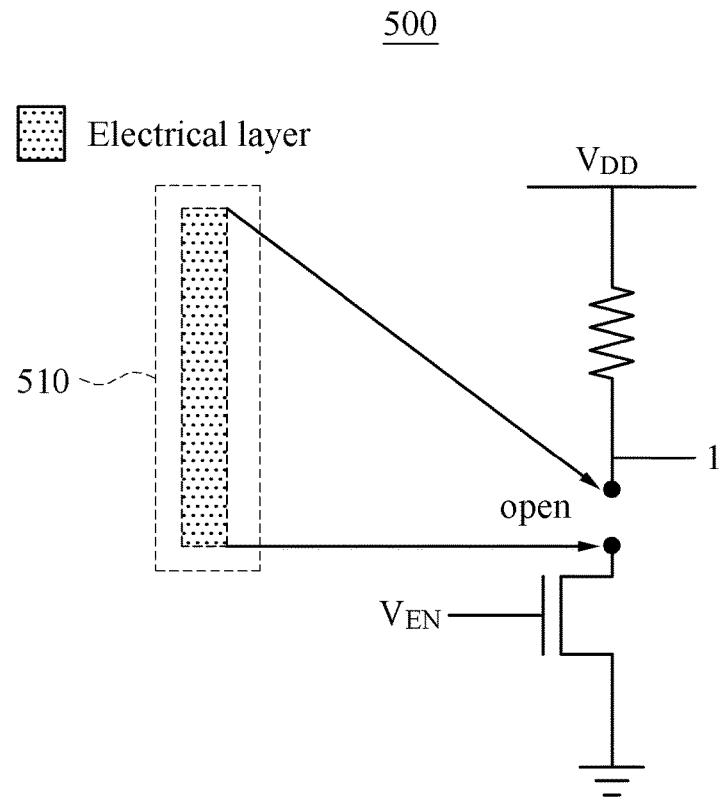
FIG. 5 is a diagram illustrating an identification key generation circuit in an example in which a conductive layer is formed abnormally in a device for generating an identification key according to an embodiment.

FIG. 5 illustrates an identification key generation circuit 500 in an example in which a conductive layer is formed abnormally in a device for generating an identification key according to an embodiment.

When a conductive layer is formed abnormally due to a dishing phenomenon, a pattern may not be formed on a portion or all of the conductive layer as shown in a conductive layer 510 of FIG. 5, and accordingly nodes (or a resistor and a transistor) in a circuit may open.

The identification key generation circuit 500 may determine whether the conductive layer 510 is formed and may provide an identification key.

The identification key generation circuit 500 may have a structure of a pull-down circuit including a resistor and an N-channel metal oxide semiconductor (NMOS) transistor. Based on whether the conductive layer 510 is formed, whether a connection between an output node and a drain node of the NMOS transistor is open or shorted may be determined.

When an enable signal transmitted to a gate of the NMOS transistor has a high value, and when the conductive layer 510 is not formed, an output value may be "1."

The identification key generation circuit 500 may be implemented by applying the same principle to a P-channel metal oxide semiconductor (PMOS) transistor in addition to the NMOS transistor, and may also be implemented using, for example, a bipolar junction transistor (BJT) or a diode.

Figure 6:
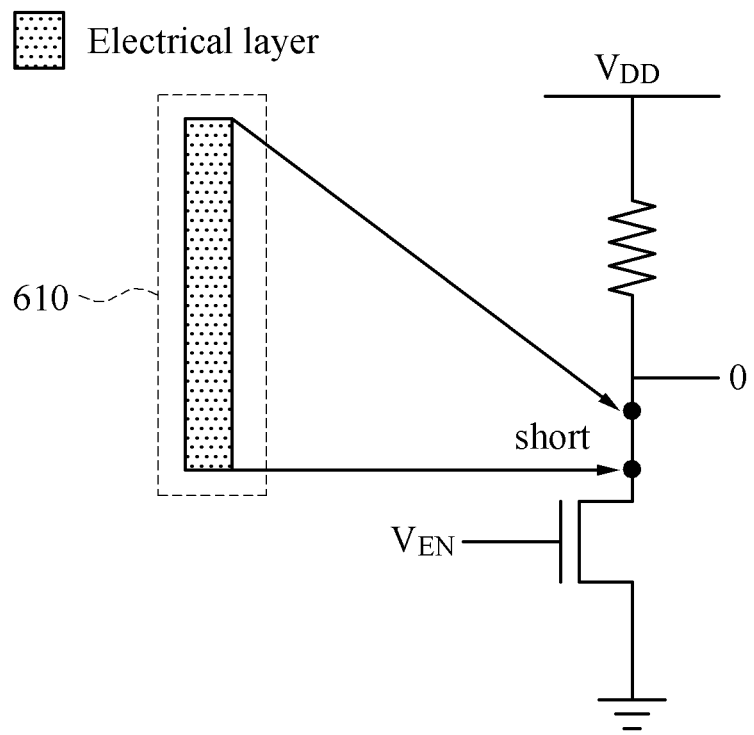
FIG. 6 is a diagram illustrating an identification key generation circuit in an example in which a conductive layer is formed normally in a device for generating an identification key according to an embodiment.

FIG. 6 illustrates an identification key generation circuit 600 in an example in which a conductive layer 610 is formed normally in a device for generating an identification key according to an embodiment.

The identification key generation circuit 600 may determine whether the conductive layer 610 is formed and may provide an identification key.

The identification key generation circuit 600 may have a structure of a pull-down circuit including a resistor and an NMOS transistor. Based on whether the conductive layer 610 is formed, whether a connection between an output node and a drain node of the NMOS transistor is open or shorted may be determined.

When an enable signal transmitted to a gate of the NMOS transistor has a high value, and when the conductive layer 610 is formed, an output value may be "0."

The identification key generation circuit 600 may be implemented by applying the same principle to a PMOS transistor in addition to the NMOS transistor, and may also be implemented using, for example, a BJT or a diode.

Figure 7:
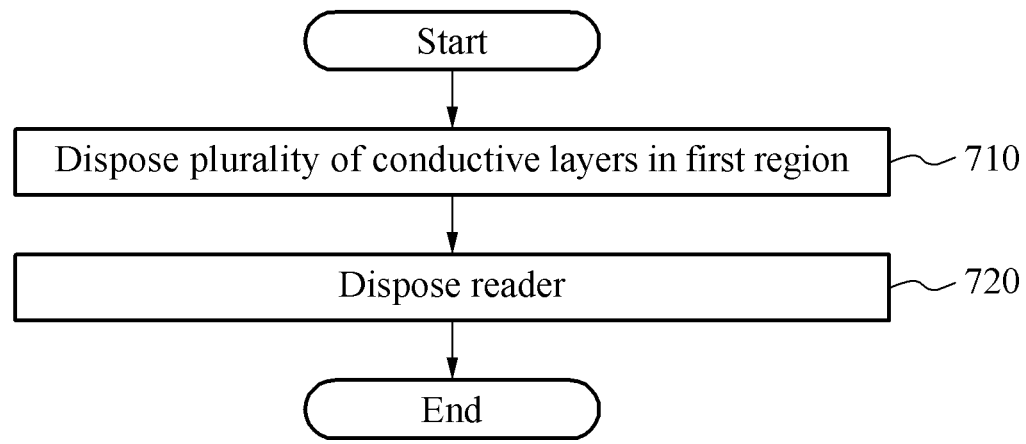
FIG. 7 is a flowchart illustrating a method of designing a device for generating an identification key according to an embodiment.

FIG. 7 is a flowchart illustrating a method of designing a device for generating an identification key according to an embodiment.

In operation 710, a plurality of conductive layers 110 may be disposed in a first region included in a semiconductor chip layout.

In operation 710, the plurality of conductive layers 110 may be disposed in the first region at a density equal to or greater than a first threshold and equal to or less than a second threshold. Here, the first threshold and the second threshold may be less than a minimum density according to a design rule that ensures that all the plurality of conductive layers are formed in the first region.

The first threshold may be a lower limit value of a density range of the plurality of conductive layers 110 to allow a difference between a probability that a first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

For example, the predetermined error range may be set based on a specific value (for example, 50%) corresponding to a probability that the first conductive layer is formed when a pattern is formed normally on the first conductive layer.

In this example, both the probability that the first conductive layer is formed and the probability that the first conductive layer is not formed may exist, and may be utilized to generate the PUF.

Also, the first threshold may be equal to or greater than a maximum density of the plurality of conductive layers 110 to guarantee that the first conductive layer is not formed, and the second threshold may be equal to or less than a minimum density of the plurality of conductive layers 110 to guarantee that the first conductive layer is formed.

When the density of the plurality of conductive layers 110 disposed in the first region is less than the minimum density according to the design rule, a probability that a pattern is formed on all the plurality of conductive layers 110 through the photolithography process may gradually decrease. Also, when the density is equal to or less than a specific density, the pattern may not be formed on all the plurality of conductive layers 110. In this example, the first threshold may be set to be equal to or greater than a maximum value of a density range in which the pattern is not formed on all the plurality of conductive layers 110. Thus, it is possible to have both a probability that the first conductive layer is formed normally and a probability that the first conductive layer is not formed.

When the density of the plurality of conductive layers 110 in the first region increases, a probability that the pattern is formed may also increase. When the density is equal to or greater than a specific value, the pattern may be formed on all the plurality of conductive layers 110. In this example, the second threshold may be set to be equal to or less than a minimum value of a density range in which the pattern is formed on all the plurality of conductive layers 110. Thus, it is possible to have both a probability that the first conductive layer is formed normally and a probability that the first conductive layer is not formed.

When the density of the plurality of conductive layers 110 in the first region is properly set in operation 710, whether the first conductive layer is formed may be randomly determined by a process variation due to a dishing phenomenon occurring in a manufacturing process of the conductive layers.

In operation 720, a reader 120 may be disposed in the semiconductor chip. The reader 120 may determine whether a first conductive layer designated in advance among the plurality of conductive layers is formed, and may provide an identification key.

An identification key generation process and a circuit configuration of the reader 120 have been described above with reference to FIGS. 5 and 6.

Figure 8:
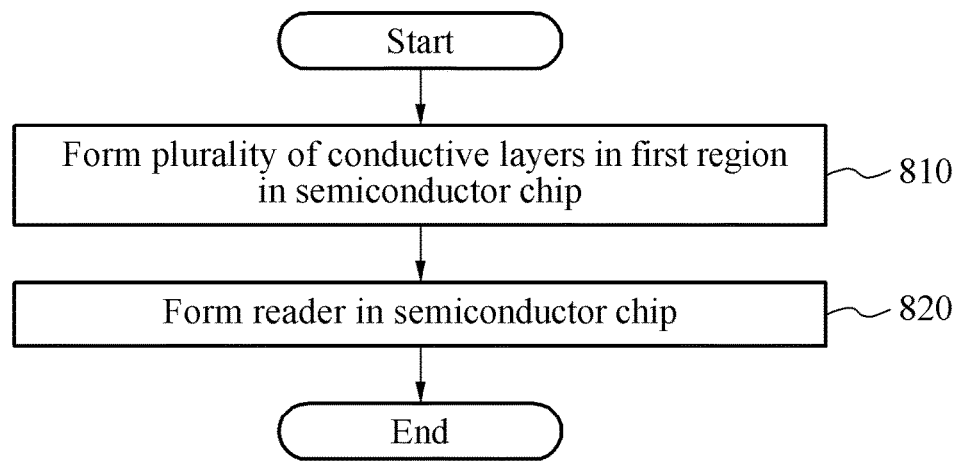
FIG. 8 is a flowchart illustrating a method of manufacturing a device for generating an identification key according to an embodiment.

FIG. 8 is a flowchart illustrating a method of manufacturing a device for generating an identification key according to an embodiment.

In operation 810, a plurality of conductive layers 110 may be formed in a first region in a semiconductor chip.

In operation 810, the plurality of conductive layers 110 may be formed in the first region at a density equal to or greater than a first threshold and equal to or less than a second threshold.

Here, the first threshold and the second threshold may be less than a minimum density according to a design rule that ensures that all the plurality of conductive layers 110 are formed in the first region.

The first threshold may be a lower limit value of a density range of the plurality of conductive layers 110 to allow a difference between a probability that a first conductive layer is formed and a probability that the first conductive layer is not formed to be within a predetermined error range, and the second threshold may be an upper limit value of the density range to allow the difference between the probability that the first conductive layer is formed and the probability that the first conductive layer is not formed to be within the predetermined error range.

Also, the first threshold may be equal to or greater than a maximum density of the plurality of conductive layers 110 to guarantee that the first conductive layer is not formed, and the second threshold may be equal to or less than a minimum density of the plurality of conductive layers 110 to guarantee that the first conductive layer is formed.

When the density of the plurality of conductive layers 110 disposed in the first region is less than the minimum density according to the design rule, a probability that a pattern is formed on all the plurality of conductive layers 110 through a photolithography process may gradually decrease. Also, when the density is equal to or less than a specific density, the pattern may not be formed on all the plurality of conductive layers 110. In this example, the first threshold may be set to be equal to or greater than a maximum value of a density range in which the pattern is not formed on all the plurality of conductive layers 110. Thus, it is possible to have both a probability that the first conductive layer is formed normally and a probability that the first conductive layer is not formed.

When the density of the plurality of conductive layers 110 in the first region increases, a probability that the pattern is formed may also increase. When the density is equal to or greater than a specific value, the pattern may be formed on all the plurality of conductive layers 110. In this example, the second threshold may be set to be equal to or less than a minimum value of a density range in which the pattern is formed on all the plurality of conductive layers 110. Thus, it is possible to have both a probability that the first conductive layer is formed normally and a probability that the first conductive layer is not formed.

The first conductive layer may be an arbitrary conductive layer located between conductive layers forming a boundary of the first region among the plurality of conductive layers 110.

Whether the first conductive layer is formed may be randomly determined by a process variation due to a dishing phenomenon occurring in a manufacturing process of the conductive layers.

At least a portion of the plurality of conductive layers may correspond to at least one of a poly layer and a metal layer.

In operation 820, a reader 120 may be formed in the semiconductor chip. The reader 120 may determine whether a first conductive layer designated in advance among the plurality of conductive layers 110 is formed, and may provide an identification key.

An identification key generation process and a circuit configuration of the reader 120 have been described above with reference to FIGS. 5 and 6.

Figure 9:
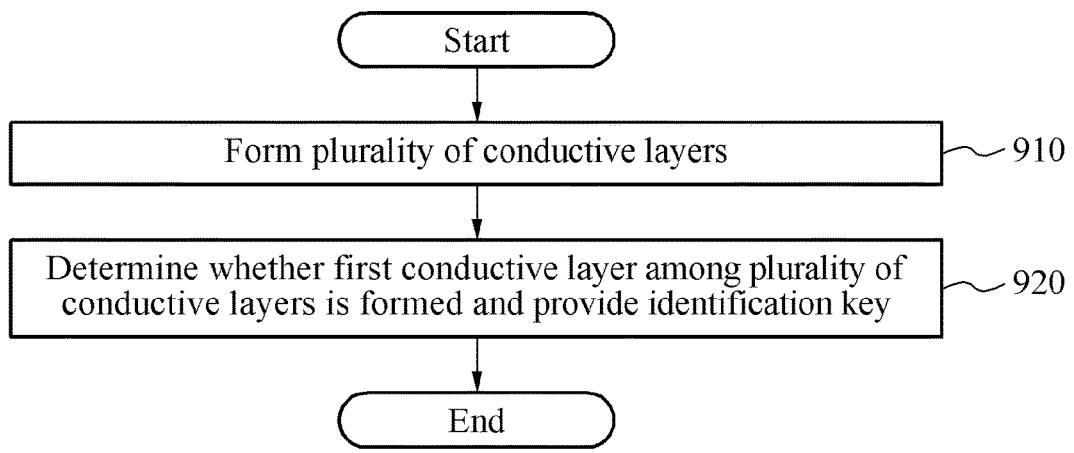
FIG. 9 is a flowchart illustrating a method of generating an identification key according to an embodiment.

FIG. 9 is a flowchart illustrating a method of generating an identification key according to an embodiment.

In operation 910, a plurality of conductive layers 110 may be formed in a first region in a semiconductor chip.

In operation 910, the plurality of conductive layers may be formed in the first region at a density equal to or greater than a first threshold and equal to or less than a second threshold. Here, the first threshold and the second threshold may be less than a minimum density according to a design rule that ensures that all the plurality of conductive layers 110 are formed in the first region.

The first threshold may be a lower limit value of a density range of the plurality of conductive layers 110 to allow a difference between a probability that a first conductive layer is formed and a probability that the first conductive layer is not formed to be within a predetermined error range, and may be equal to or greater than a maximum density of the plurality of conductive layers 110 to guarantee that the first conductive layer is not formed.

The second threshold may be an upper limit value of the density range to allow the difference between the probability that the first conductive layer is formed and the probability that the first conductive layer is not formed to be within the predetermined error range, and may be equal to or less than a minimum density of the plurality of conductive layers 110 to guarantee that the first conductive layer is formed.

In operation 920, the reader 120 may determine whether a first conductive layer designated in advance among the plurality of conductive layers is formed, and may provide an identification key.

An identification key generation process and a circuit configuration of the reader 120 have been described above with reference to FIGS. 5 and 6.

The units described herein may be implemented using hardware components, software components, and/or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A device for generating an identification key, the device comprising:
   a plurality of conductive layers formed between a first plurality of nodes and a second plurality of nodes in a first region in a semiconductor chip, the nodes connecting respective conductive layers to further circuit elements, a density of the plurality of conductive layers disposed in the first region being equal to or greater than a first predetermined threshold density and equal to or less than a second threshold density, and the first predetermined threshold density and the second threshold density being less than a minimum density, the minimum density is a density of the plurality of conductive layers disposed in the first region at which shorted connections between respective nodes of the first and second pluralities of nodes are formed by each conductive layer; and
   a reader connected to the first and second plurality of nodes determining whether a first conductive layer among the plurality of conductive layers forms a shorted connection between respective nodes and generating an identification key value based on the determination of the reader.

2. The device of claim 1, wherein the first predetermined threshold density is a lower limit value of a density range to allow a difference between a probability that the first conductive layer forms a shorted connection and a probability that the first conductive layer does not form a shorted connection to be within a predetermined error range, and
   wherein the second threshold density is an upper limit value of the density range to allow the difference between the probability that the first conductive layer forms a shorted connection and the probability that the first conductive layer does not form a shorted connection to be within the predetermined error range.

3. The device of claim 1, wherein the first predetermined threshold density is equal to or greater than a maximum density that ensures the plurality of conductive layers disposed in the first region does not form a shorted connection, and
   wherein the second threshold density is equal to or less than the minimum density.

4. The device of claim 1, wherein the first conductive layer is at least one conductive layer located between conductive layers forming a boundary of the first region among the plurality of conductive layers.

5. The device of claim 1, wherein whether the first conductive layer forms a shorted connection is randomly determined by a process variation due to a dishing phenomenon occurring in a manufacturing process of the plurality of conductive layers.

6. The device of claim 1, wherein at least a portion of the plurality of conductive layers corresponds to at least one of a poly layer and a metal layer.

* * * * *